United States Patent
Rockwell et al.

(10) Patent No.: US 11,643,610 B2
(45) Date of Patent: May 9, 2023

(54) DEWAXED DIESEL FUEL COMPOSITION

(71) Applicant: ExxonMobil Technology and Engineering Company, Annandale, NJ (US)

(72) Inventors: Gregory P. Rockwell, Sarnia (CA); Alex S. Lang, Brigden (CA)

(73) Assignee: EXXONMOBIL TECHNOLOGY AND ENGINEERING COMPANY, Annandale, NJ (US)

(*) Notice: Subject to any disclaimer, the term of this patent is extended or adjusted under 35 U.S.C. 154(b) by 202 days.

(21) Appl. No.: 16/015,354

(22) Filed: Jun. 22, 2018

(65) Prior Publication Data

US 2019/0185771 A1    Jun. 20, 2019

Related U.S. Application Data

(60) Provisional application No. 62/607,413, filed on Dec. 19, 2017.

(51) Int. Cl.
*C10L 1/02* (2006.01)
*C10L 1/196* (2006.01)
(Continued)

(52) U.S. Cl.
CPC .............. *C10L 1/026* (2013.01); *C10G 45/64* (2013.01); *C10L 1/18* (2013.01); *C10L 1/196* (2013.01);
(Continued)

(58) Field of Classification Search
CPC ..... C10L 2200/0446; C10L 2200/0469; C10L 2270/026; C10L 2200/0476; C10L 1/026; C10L 1/196
See application file for complete search history.

(56) References Cited

U.S. PATENT DOCUMENTS 3,894,938 A * 7/1975 Gorring ............... C10G 65/043
                                                        208/97
5,772,705 A * 6/1998 Caprotti ................. C10L 1/143
                                                        44/389

(Continued)

FOREIGN PATENT DOCUMENTS

EP       1674552 A1      6/2006
EP       1675542 A1 *    7/2006   ........... A61F 13/539
(Continued)

OTHER PUBLICATIONS

Machine Translation of JP-2008088243-A (Year: 2008).*
(Continued)

*Primary Examiner* — Ellen M McAvoy
*Assistant Examiner* — Ming Cheung Po
(74) *Attorney, Agent, or Firm* — Shook, Hardy & Bacon L.L.P.

(57) ABSTRACT

Diesel fuel compositions are provided that have unexpectedly beneficial cold flow properties. Methods for forming such diesel fuel compositions are also provided. The improved cold flow properties are achieved in part based on dewaxing of a distillate fraction of the composition. The improved cold flow properties are achieved further in part based on inclusion of a cold flow additive and fatty acid alkyl ester in the composition, such as fatty acid methyl ester.

25 Claims, 3 Drawing Sheets

(51) Int. Cl.
  *C10G 45/64* (2006.01)
  *C10L 10/14* (2006.01)
  *C10L 1/18* (2006.01)
  *C10L 1/19* (2006.01)
  *C10L 1/197* (2006.01)
(52) U.S. Cl.
  CPC ...... *C10L 10/14* (2013.01); *C10G 2300/1055* (2013.01); *C10G 2300/1059* (2013.01); *C10G 2300/304* (2013.01); *C10G 2300/80* (2013.01); *C10L 1/191* (2013.01); *C10L 1/1973* (2013.01); *C10L 2200/0446* (2013.01); *C10L 2200/0476* (2013.01); *C10L 2270/026* (2013.01); *Y02E 50/10* (2013.01)

(56) References Cited

U.S. PATENT DOCUMENTS

| | | | |
|---|---|---|---|
| 6,190,427 B1 * | 2/2001 | Ahmed | C10L 10/02 44/418 |
| 6,652,735 B2 * | 11/2003 | Degnan | C10G 65/043 585/734 |
| 8,292,976 B2 | 10/2012 | Regrut et al. | |
| 8,674,160 B2 | 3/2014 | Hanks et al. | |
| 8,821,595 B2 * | 9/2014 | Knottenbelt | C10L 10/12 44/388 |
| 9,133,409 B2 * | 9/2015 | Muller | C10L 1/143 |
| 9,267,086 B2 | 2/2016 | Yeh et al. | |
| 2004/0010072 A1 | 1/2004 | Krull et al. | |
| 2006/0236598 A1 | 10/2006 | Selvidge | |
| 2007/0113467 A1 * | 5/2007 | Abou-Nemeh | C10L 1/183 44/388 |
| 2007/0187291 A1 * | 8/2007 | Miller | C10L 1/04 208/15 |
| 2007/0240361 A1 * | 10/2007 | Clayton | C10L 1/191 44/385 |
| 2008/0163541 A1 * | 7/2008 | Harris | B65F 1/16 43/131 |
| 2010/0005706 A1 * | 1/2010 | Burgazli | C10L 1/026 44/308 |
| 2010/0154733 A1 * | 6/2010 | Brewer | C10L 10/14 44/388 |
| 2011/0219669 A1 | 9/2011 | Hanks et al. | |
| 2011/0219671 A1 * | 9/2011 | Hanks | C10L 1/08 44/307 |
| 2012/0285078 A1 * | 11/2012 | Yeh | C10L 1/026 44/388 |
| 2015/0344801 A1 | 12/2015 | Maehling et al. | |

FOREIGN PATENT DOCUMENTS

| | | | | |
|---|---|---|---|---|
| EP | 2078744 A1 | | 7/2009 | |
| EP | 2531579 A1 | * | 12/2012 | ............. C10L 10/14 |
| EP | 2531579 B1 | * | 3/2016 | ............. C10L 10/14 |
| JP | 2008088243 A | * | 4/2008 | |
| JP | 2008088243 A | | 4/2008 | |
| WO | WO1994010267 | * | 5/1994 | |
| WO | WO1994017159 A1 | * | 8/1994 | |
| WO | 2009/020056 A1 | | 2/2009 | |
| WO | WO-2009020056 A1 | * | 2/2009 | ............... C10L 1/08 |

OTHER PUBLICATIONS

Machine Translation of WO-2009020056-A1 (Year: 2009).*
Robert Dunn, Improving the Cold Flow Properties of Biodiesel by Fractionation, Apr. 2011, Soybean—Applications and Technology, 211-240 (Year: 2011).*
R.O.Dunn, M.W.Shockley, and M.O.Bagby, "Improving the Low-Temperature Properties of Alternative Diesel Fuels: Vegetable Oil-Derived Methyl Ester", 1996, JAOCS, vol. 73, 1719-1728 (Year: 1996).*
The International Search Report and Written Opinion of PCT/US2018/038918 dated Aug. 24, 2018.
Chandler, "Comparison of All Weather Chassis Dynamometer Low Temperature Operability Limits for Heavy and Light Duty Trucks with Standard Laboratory Test Methods", SAE 962197, International Truck & Bus Meeting & Exposition, Detroit, Michigan, Oct. 14-16, 1996.
Mitchell, et al., "The Use of Flow Improved Diesel Fuel at Extremely Low Temperatures", SAE 982576,International Fall Fuels and Lubricants, Meeting and Exposition, San Francisco, California, Oct. 19-22, 1998.
Chandler et al., "Low Temperature Operability Limits of Late Model Heavy Duty Diesel Trucks and the Effect Operability Additives and Changes to the Fuel Delivery System Have on Low Temperature Performance", SAE 2000-01-2883, International Fall Fuels and Lubricants, Meeting and Exposition, Baltimore, Maryland, Oct. 16-19, 2000.
1981 CRC Diesel Fuel Low-Temperature Operability Field Test, CRC Heavy-Duty Vehicle Fuel, Lubricant, and Equipment Research Committee of the Coordinating Research Council, Inc.Sep. 1983.
CRC Report No. 650, Biodiesel blend low-temperature performance validation, CRC Project:DP-2a-07, Jun. 2008.
CRC Report No. 670, The effect of biodiesel impurities on wax settling in low temperature light-duty diesel vehicles, CRC Project: DP-05-12, Apr. 2016.
Knothe, The Biodiesel Handbook, Second editions, AOCS Press, 2015, Chapter 6 Fuel, pp. 137-251.
Dunn, "Crystallization Behavior of Fatty Acid Methyl Esters", J. Am Oil Chem Soc (2008), 85:961-972.
Liu, "Development of low-temperature properties on biodiesel fuel: a review", International Journal of Energy Research, Int. J. Energy Res 2015; 39:1295-1310.

* cited by examiner

DEWAXED DIESEL FUEL COMPOSITION

CROSS-REFERENCE TO RELATED APPLICATIONS

This application claims priority to U.S. Provisional Application Ser. No. 62/607,413 filed Dec. 19, 2017, which is herein incorporated by reference in its entirety.

FIELD

The invention relates to diesel fuel compositions that include a dewaxed distillate fraction, fatty acid alkyl ester, and a cold flow additive.

BACKGROUND

In cold climates, the ability to produce diesel fuels in a cost-effective manner while still satisfying cold flow requirements is a significant factor in the profitability of fuel suppliers. Shifting more kerosene molecules into diesel fuel can result in lower profitability, as this can reduce the amount of kerosene available for higher margin products such as jet fuel.

An alternative to using lighter distillate streams and/or blending more kerosene into diesel fuel to satisfy cold flow requirements can be to include a catalytic dewaxing stage as part of hydroprocessing. In a dewaxing process, wax-forming normal paraffins in a distillate fraction can be selectively removed by isomerization or cracking to improve the cold flow properties of the final diesel fuel, such as pour point, cloud point, cold filter plugging point (CFPP), or low temperature flow test (LTFT). Such improvements in cold flow properties can, for example, allow a refiner to improve its profitability by moving heavier distillate streams into the diesel fuel pool and lighter distillate streams into the jet fuel pool. While such benefits can be substantial, performing a dewaxing process uses additional refinery resources, such as energy and hydrogen, and can have other drawbacks, such as destruction of molecules that enhance cetane number.

Still another option for improving the cold flow properties of a diesel fuel can be to include a cold flow additive in the diesel fuel. Depending on the functionality of the additive, it may be known as a cloud point depressant (CPD), pour point depressant (PPD), middle distillate flow improver (MDFI), wax antisettling additive (WASA), or wax antisettling flow improver (WAFI). Diesel fuels are commonly treated with MDFI or WAFI, the latter combining an MDFI with a WASA. MDFIs typically incorporate polymers acting as nucleators and polymers acting as wax growth arrestors. Both types of polymers are commonly copolymers of ethylene and vinyl esters, especially copolymers of ethylene and vinyl acetate. The difference in functionality between the nucleators and wax growth arrestors is achieved, for example, by varying the average molecular weight of the copolymers and ratio of ethylene to vinyl ester. While MDFI and WAFI are often effective at reducing the pour point or CFPP of diesel fuel, more modest benefits are typically achieved for cloud point and LTFT. It is cloud point and LTFT, however, that best assure low temperature operability in heavy duty trucks, and at least one standards body (Canadian General Standards Board) does not permit CFPP.

In addition to distillate fractions from mineral sources (e.g., crude oil, oil sands, shale oil), diesel fuel may contain fatty acid alkyl ester (FAAE) and/or synthetic hydrocarbon from processes such as gas-to-liquid (GTL), biomass-to-liquid (BTL), or hydrogenation of glycerides and fatty acids (e.g., hydrogenation derived renewable diesel—HDRD). Compared to FAAE, synthetic hydrocarbons are more readily incorporated into diesel fuel without degrading fuel properties due to their chemical similarity to distillate fractions from mineral sources. Unfortunately, synthetic hydrocarbons also tend to be more expensive than FAAE, especially compared to fatty acid methyl ester (FAME), which can make BTL and HDRD less desirable for meeting regulatory requirements for renewable content in diesel fuel. Issues with the cold flow properties of FAME, however, are well known. For instance, even at low blend levels (e.g., less than or equal to 5% by volume), FAME is known to raise the cloud point of diesel fuel and contribute impurities (e.g., saturated monoglycerides, sterol glucosides) that can separate above the cloud point of FAME-containing blends. FAME is also known to make cold flow additives less effective for treating diesel fuel. As a result, the incorporation of FAME into diesel fuel in cold climates is frequently offset with higher blend levels of kerosene or avoided altogether.

What is needed are further improvements in the ability to make diesel fuel compositions with adequate cold flow properties that reduce or minimize the need to supplement the diesel fuel compositions with kerosene boiling range material.

U.S. Pat. No. 8,292,976 describes a diesel fuel additive and a method for reducing emissions from an engine combusting a middle distillate fuel. The fuel additive contains a combination of a cetane improver and a mineral oil co-additive. The mineral oil co-additive can correspond to a lubricating oil base stock or a Fischer-Tropsch oil with a similar boiling range. Optionally, a portion of a fatty acid methyl ester can be incorporated into the diesel fuel.

U.S. Patent Application Publication 2006/0236598 describes biodiesel fuel compositions that include biodiesel, mineral diesel, and an additive. The additive can correspond to an additive suitable for reducing clogging of filters at low temperatures, such as a glycol ether additive. The blend is described as being useful for reducing precipitates that form when biodiesel with substantial water content is exposed to colder temperatures.

U.S. Patent Application Publication 2015/0344801 describes cold flow improvers for use with mineral diesel fuels, biodiesel fuels, and blends thereof. The cold flow improvers correspond to polymer compositions that include a polyalkyl(meth)acrylate polymer, a graft copolymer corresponding to a copolymer based on ethylene as graft base and one or more polyalkyl(meth)acrylate polymers grafted thereon, and at least one non-grafted ethylene-based copolymer. The cold flow improvers are described as being beneficial for improving cold flow properties of mineral diesel, biodiesel, and blends thereof.

U.S. Pat. No. 8,674,160 describes dewaxing of renewable diesel fuel, such as dewaxing of feeds containing a hydrotreated biocomponent portion. Such feeds can optionally further include a mineral portion.

European Patent Application Publication EP 2078744 describes adding a Fischer-Tropsch derived gas oil component to a composition including a middle distillate base fuel and a cold flow additive. The addition of the Fischer-Tropsch derived gas oil component is described to as being useful for reducing the cold filter plugging point of the composition.

SUMMARY

In various aspects, a method for increasing the response of diesel fuel to cold flow additive is provided. The method includes incorporating 0.5 vol % to 10 vol % of fatty acid alkyl ester into a diesel base comprising a dewaxed distillate fraction to form a diesel fuel composition. The diesel fuel composition can further include 100 ppmv to 4000 ppmv of a cold flow additive. The resulting diesel fuel composition can have a minimum low temperature flow test (LTFT) pass temperature of −10° C. or less.

In various additional aspects, a diesel fuel composition is provided. The diesel fuel compositions can include a dewaxed distillate fraction, such as a dewaxed distillate fraction having a T5 distillation point of 138° C. or more. The diesel fuel composition can further include 0.5 vol % to 10 vol % of fatty acid alkyl ester. The diesel fuel composition can further include 100 ppmv to 4000 ppmv of a cold flow additive, such as 100 ppmv to 3000 ppmv or 300 ppmv to 1500 ppmv. The diesel fuel composition can have a minimum LTFT pass temperature of −10° C. or less.

The amount of fatty acid alkyl ester in the diesel fuel composition can correspond to 1.0 vol % to 7.0 vol % of the diesel fuel composition. Examples of suitable fatty acid alkyl esters can include, but are not limited to, fatty acid methyl esters. Examples of fatty acid methyl esters correspond to canola methyl ester, soy methyl ester, corn oil methyl ester, rapeseed methyl ester, sunflower oil methyl ester, or mixtures thereof. In some aspects, the fatty acid alkyl ester can have a CSFBT of 1.8 or less and/or a cloud point of 3° C. or less.

In some aspects, the cold flow additive can correspond to copolymers of ethylene and vinyl esters, the vinyl esters optionally comprising vinyl acetate, vinyl 2-ethylhexanoate, or a combination thereof.

In some aspects, the dewaxed distillate fraction can correspond to a distillate fraction that is catalytically dewaxed through isomerization, cracking, or a combination thereof. Examples of isomerization dewaxing catalysts can include ZSM-48 and/or ZSM-23. Examples of cracking dewaxing catalysts can include ZSM-5 and/or USY. Additionally or alternately, the cloud point of the dewaxed distillate fraction can be −10° C. to −40° C.

The drop in minimum LTFT pass temperature associated with the use of cold flow additive for the diesel fuel composition can be 5° C. or more, or 9° C. or more. By contrast, the change in cold filter plugging point associated with the use of cold flow additive for the diesel fuel composition can be a drop of 4° C. or less and/or an increase of 1° C. or more.

DETAILED DESCRIPTION

Figure 1:
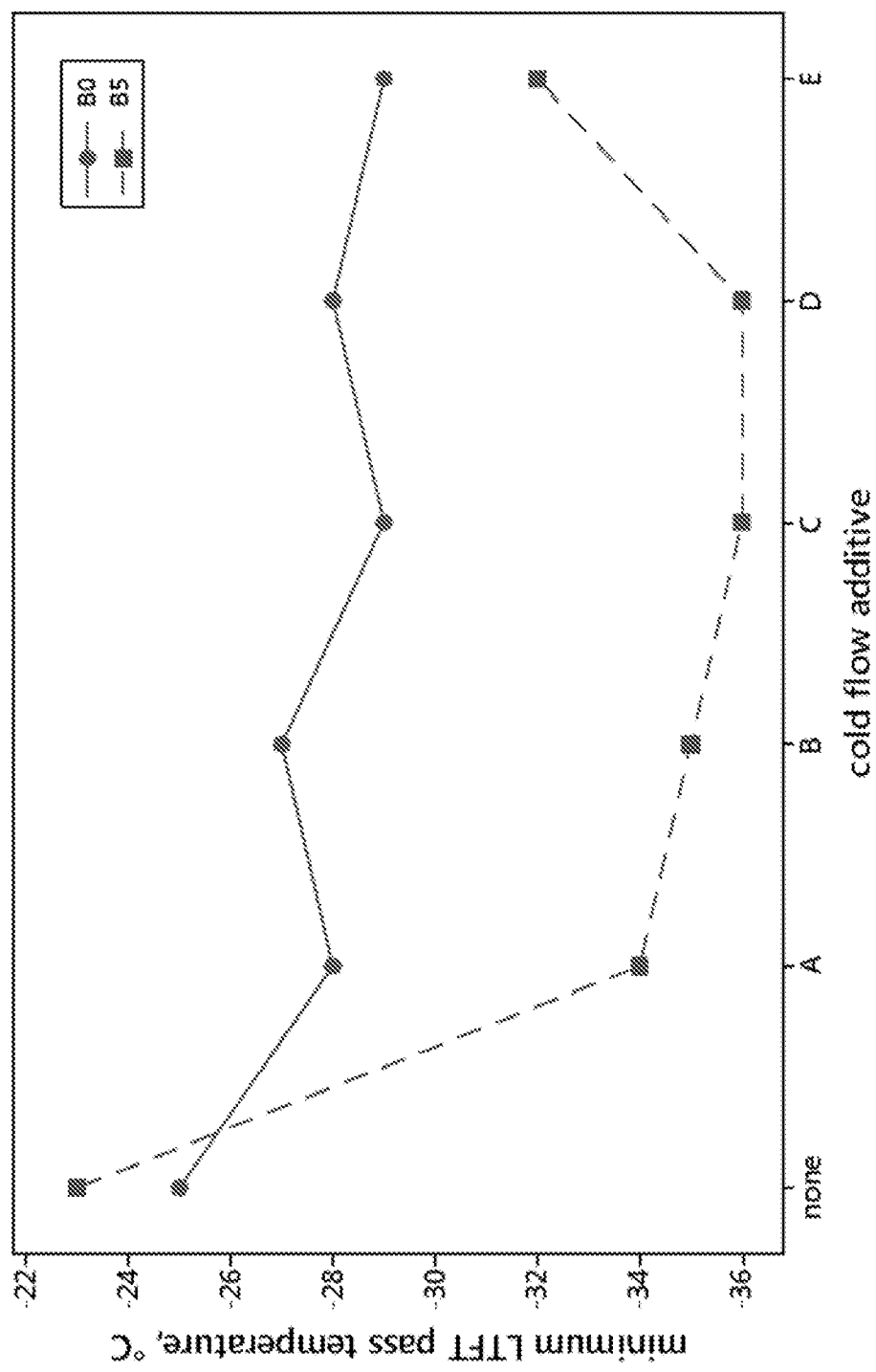
FIG. 1 shows minimum LTFT pass temperatures for a variety of diesel fuels that include a dewaxed distillate fraction that is dewaxed by a catalyst that dewaxes primarily by isomerization. The diesel fuels differ in FAME content and/or cold flow additive.

All numerical values within the detailed description and the claims herein are modified by "about" or "approximately" the indicated value, and take into account experimental error and variations that would be expected by a person having ordinary skill in the art. The term "distillate fraction" is used to mean a diesel fuel blend component, excluding FAAE and additives. The term "dewaxed distillate fraction" is used to mean a distillate fraction that has been treated in a catalytic dewaxing process. The term "dewaxed diesel fuel" is used to mean a diesel fuel comprising a dewaxed distillate fraction.

Overview

In various aspects, diesel fuel compositions are provided that have unexpectedly beneficial cold flow properties. The improved cold flow properties are achieved in part based on dewaxing of a distillate fraction of the composition. The improved cold flow properties are achieved further in part based on inclusion of a cold flow additive and fatty acid alkyl ester (FAAE) in the composition.

Conventional methods for improving one or more cold flow properties of a diesel fuel include incorporating lighter distillate fractions into the fuel, dewaxing a portion of the fuel, and treating the fuel with cold flow additive. Due to competing uses for lighter distillate fractions, it is frequently desirable to utilize heavier distillate fractions for diesel fuel and compensate for the poorer cold flow properties by dewaxing the heavier fractions or by treating the diesel fuel with cold flow additive. There are, however, limitations on the amount of improvement that can be achieved via dewaxing without significantly impacting other factors, such as yield, operating costs and other measures of product quality (e.g., cetane). Cold flow additives are also conventionally limited in their ability to improve key cold flow properties, such as cloud point and LTFT, and typically show diminished performance in the presence of FAAE.

It has been unexpectedly discovered that the benefit of adding a cold flow additive to a dewaxed diesel fuel can be increased by also adding FAAE to the fuel. FAAE typically have relatively poor cold flow properties in comparison to dewaxed diesel fuel. For example, FAME can typically have a cloud point of −5° C. or higher, while a dewaxed diesel fuel might be required to meet a cloud point specification of −10° C. or less, −20° C. or less, or −30° C. or less. As a result, addition of FAAE to dewaxed diesel fuel would not be expected to be beneficial to cold flow. However, it has been discovered that addition of FAAE to dewaxed diesel fuel can enhance the improvement in cold flow properties that is achieved by addition of cold flow additive. Significantly, this enhancement can be demonstrated in the rigorous LTFT method.

In some aspects, a dewaxed distillate fraction can correspond to a heavy portion of a dewaxed diesel fuel. In such aspects, the dewaxed distillate fraction can correspond to a 260° C.+ fraction, or a 280° C.+ fraction, or a 300° C.+ fraction. In other aspects, the dewaxed distillate fraction can correspond to a broader boiling range distillate fraction, such as by performing dewaxing on substantially all of a distillate boiling range feed. Optionally, a dewaxed diesel fuel can include a dewaxed distillate fraction and one or more additional (optionally dewaxed) distillate fractions.

Components

In some aspects, a dewaxed distillate fraction can have an initial boiling point of at least 230° F. (110° C.), or at least 250° F. (121° C.), or at least 300° F. (149° C.), or at least 350° F. (177° C.), or at least 400° F. (204° C.), or at least 450° F. (232° C.), such as up to 550° F. (288° C.) or possibly still higher. The initial boiling point can vary widely, depending on how much kerosene or other lighter distillates are included. In another embodiment, a dewaxed distillate fraction can have a final boiling point of 800° F. (427° C.) or less, or 700° F. (371° C.) or less, or 650° F. (343° C.) or less. Another way of characterizing a distillate fraction is based on the temperature required to boil and recover a specified percentage by volume. For example, the temperature required to boil and recover 5 vol % is referred to as the "T5." A dewaxed distillate fraction can have a T5 of at least 280° F. (138° C.), or at least 300° F. (149° C.), or at least 350° F. (177° C.), or at least 400° F. (204° C.), or at least 450° F. (232° C.), such as up to 550° F. (288° C.) or possibly still higher. Optionally but preferably, a dewaxed distillate fraction can also include a reduced or minimized amount of lighter distillate components, so that the T5 is 200° C. or more, or 230° C. or more, or 260° C. or more, such as up to 300° C. or possibly still higher. In other aspects, the dewaxed distillate fraction can have a T95 of 800° F. (427° C.) or less, or 750° F. (399° C.) or less, or 700° F. (371° C.) or less, or 650° F. (343° C.) or less, or 600° F. (316° C.) or less. Examples of suitable T5 to T95 boiling ranges can include a T5 of 200° C. or more and a T95 of 427° C. or less; or a T5 of 200° C. or more and a T95 of 370° C. or less; or a T5 of 220° C. or more and a T95 of 350° C. or less. Distillation properties for a distillate fraction can be determined by ASTM D86. When forming a diesel fuel composition, the portion of the diesel fuel composition that includes a dewaxed distillate fraction, prior to introduction of FAAE, can be referred to as a diesel base.

In some aspects, the feed for a dewaxed distillate fraction can comprise a mineral oil. By "mineral oil" is meant an oil originating from a fossil/mineral fuel source, such as crude oil, oil sands or shale oil, and not the commercial organic product, such as sold under the CAS number 8020-83-5, e.g., by Aldrich. Examples of mineral oils can include, but are not limited to, straight run (atmospheric) gas oils, demetallized oils, coker distillates, cat cracker distillates, hydrocracker distillates, heavy naphthas, diesel fuel boiling range distillates, heating oil boiling range distillates, jet fuel boiling range distillates, and kerosene boiling range distillates. The mineral oil portion of the feed can comprise any one of these example streams or any combination thereof. Preferably, the feed does not contain any appreciable asphaltenes.

In various aspects, feeds for a dewaxed distillate fraction can have a nitrogen content from <1.0 wppm to 6000 wppm nitrogen, such as <1.0 wppm to 10 wppm, 100 wppm to 500 wppm, or 1000 wppm to 3000 wppm. In various aspects, feeds for a dewaxed distillate fraction can have a sulfur content from <1.0 wppm to 40,000 wppm, such as <1.0 wppm to 20 wppm, 500 wppm to 5,000 wppm, or 5,000 wppm to 25,000 wppm. Depending on the aspect, a feed can be hydrotreated prior to dewaxing to reduce the amount of sulfur and/or nitrogen content that a dewaxing catalyst is exposed to. In such aspects, performing a separation between the hydrotreating and dewaxing stages may be desirable. Either with or without such hydrotreating, in some aspects the sulfur content of a dewaxed distillate fraction can be 2000 wppm or less, or 200 wppm or less. In such aspects, the nitrogen content of the dewaxed distillate fraction can be 500 wppm or less, or 50 wppm or less. In some aspects where the distillate fraction corresponds to a hydrotreated dewaxed distillate fraction, the hydrotreated dewaxed distillate fraction can contain very low amounts of sulfur and nitrogen, such as a nitrogen content of 50 wppm or less, or 10 wppm or less, and a sulfur content of 50 wppm or less, or 15 wppm or less.

Prior to dewaxing, an optionally hydrotreated distillate feed can have a cloud point of −30° C. or more, or −20° C. or more, or −10° C. or more, or 0° C. or more, such as up to 10° C. or possibly higher. After dewaxing, a dewaxed distillate fraction can have a cloud point of 0° C. or less, or −10° C. or less, or −20° C. or less, or −30° C. or less, or −40° C. or less, such as down to −50° C. or possibly lower. For example the cloud point of the dewaxed distillate fraction can be −10° C. to −40° C., or −20° C. to −40° C. Cloud point can be determined according to ASTM D2500 or ASTM D5773.

In addition to a dewaxed distillate fraction, a dewaxed diesel fuel can include FAAE, such as FAME. The FAAE can conform to an industry standard, such as ASTM D6751, CAN/CGSB-3.524, or EN 14214. The FAAE can be made from a variety of natural oils or fats (e.g., canola, corn, palm, rapeseed, soybean, sunflower, tallow), recycled oils or fats (e.g., yellow grease, brown grease), or mixtures thereof. The alcohol used to make the FAAE can be methanol, ethanol, or other higher alcohols. Optionally but preferably, the FAAE can have a cloud point of 3° C. or less and/or a cold soak filter blocking tendency (CSFBT) of 1.8 or less. The CSFBT can be measured according to CAN/CGSB-3.0 No. 142.0. The amount of FAAE blended into the dewaxed diesel fuel can be 0.5 vol % to 10 vol %, or 1.0 vol % to 7.0 vol %, or 1.0 vol % to 5.5 vol %, or 1.5 vol % to 7.0 vol %, or 1.5 vol % to 5.5 vol %.

A dewaxed diesel fuel can also contain a cold flow additive, such as a CPD, PPD, MDFI, WASA or WAFI. The cold flow additive can contain copolymers of ethylene and vinyl esters, such as copolymers of ethylene and vinyl acetate, copolymers of ethylene and vinyl 2-ethylhexanoate, and/or copolymers of ethylene, vinyl acetate and vinyl 2-ethylhexanoate. Optionally but preferably, the cold flow additive can be at least one of the following: PPD, MDFI, WAFI. The cold flow additive can be an additive for reducing pour point, CFPP, minimum LTFT pass temperature, or combinations thereof. The concentration of cold flow additive in a dewaxed diesel fuel can depend on the additive's formulation, such as the amount of solvent with active ingredient, and can be within the range specified by the additive supplier. These ranges can vary from a minimum effective concentration to a maximum concentration beyond which the additive becomes less beneficial to cold flow or can have undesirable effects. Examples of minimum concentrations include 10 ppmv or more, or 25 ppm or more, or 50 ppm or more, or 100 ppm or more, or 500 ppm or more, or 1000 ppm or more. Examples of maximum concentrations include 500 ppm or less, or 1000 ppm or less, or 3000 ppm or less, or 5000 ppm or less. Concentrations can be volume based (ppmv or vppm) or weight based (ppmw or wppm). Examples of concentration ranges include from 20 ppmv to 1000 ppmv, from 50 ppmw to 500 ppmw, from 100 ppmv to 4000 ppmv, from 100 ppmw to 4000 ppmw, from 300 ppmv to 1500 ppmv, from 500 ppmv to 2000 ppmv, or from 1000 ppmv to 3000 ppmv.

A dewaxed diesel fuel can also contain one or more additional (optionally dewaxed) distillate fractions. These distillate fractions can comprise mineral oils, such as straight run (atmospheric) gas oils, demetallized oils, coker distillates, cat cracker distillates, hydrocracker distillates, heavy naphthas, diesel fuel boiling range distillates, heating oil boiling range distillates, jet fuel boiling range distillates, kerosene boiling range distillates, or combinations thereof. Mineral oils can be hydrotreated to improve their qualities as blend components, such as by reducing sulfur content to meet a sulfur specification or removing reactive functional groups to improve stability. Distillate fractions can also comprise synthetic hydrocarbons, such as GTL hydrocarbons, BTL hydrocarbons, HDRD, or hydroprocessed esters and fatty acids (HEFA). Compared to mineral oils, synthetic hydrocarbons can have low sulfur content, low nitrogen content, low aromatics content, and high cetane number. Incorporation of synthetic hydrocarbons into dewaxed diesel fuel can be beneficial to improve these fuel properties and, in the case of renewable synthetic hydrocarbons (e.g., BTL hydrocarbons, HDRD, HEFA), raise renewable content. Distillate fractions, including synthetic hydrocarbons, can optionally be dewaxed to improve their cold flow properties. Lighter distillate fractions, such as those with a T95 of 320° C. or less, 300° C. or less, 280° C. or less, or 260° C. or less, can also be selected to enhance the cold flow properties of a dewaxed diesel fuel.

Hydroprocessing—Dewaxing

Catalytic dewaxing relates to the removal and/or isomerization of long chain, paraffinic molecules from feeds. Catalytic dewaxing can be accomplished by selective hydrocracking or by hydroisomerizing these long chain molecules. Dewaxing catalysts can correspond to catalysts having crystalline zeolitic framework structures, such as crystalline aluminosilicates or silico-aluminophosphates (SAPOs). Some zeolitic structures can correspond to molecular sieves. In an aspect, the zeolitic framework structure can be a framework structure having 1-D or 3-D channels. In an aspect, the zeolitic framework structure can correspond to a 10-member ring 1-D framework structure. Examples of suitable zeolitic framework structures can include, but are not limited to, MRE (ZSM-48), MTT (ZSM-23), FER (ZSM-35), BEA (zeolite Beta), FAU (USY), MFI (ZSM-5), and combinations thereof. Some types of catalysts can perform dewaxing primarily by cracking, while other types of catalysts can perform dewaxing primarily by isomerization. For example, dewaxing catalysts with a zeolitic framework structure corresponding to MRE and/or MTT can correspond to catalysts that perform dewaxing primarily by isomerization. Dewaxing catalysts having a framework structure of MFI and/or FAU can correspond to catalysts that perform dewaxing primarily by cracking.

Optionally, the dewaxing catalyst can include a binder for the zeolitic framework structure, such as alumina, titania, silica, silica-alumina, zirconia, or a combination thereof. In an embodiment, the binder can be alumina, titania, or a combination thereof. In another embodiment, the binder can be titania, silica, zirconia, or a combination thereof.

One feature of zeolitic framework structures that can impact activity is the ratio of silica to alumina in the framework structure. In an aspect, the zeolitic framework structure can have a silica to alumina ratio of 200 to 1 or less, or 120 to 1 or less, or 100 to 1 or less, or 90 to 1 or less, or 75 to 1 or less. In an aspect, the zeolitic framework structure can have a silica to alumina ratio of at least 30 to 1, or at least 50 to 1, or at least 65 to 1. For example, the silica to alumina ratio can be 30:1 to 200:1, or 65:1 to 100:1, or 50:1 to 120:1, or 30:1 to 75:1.

The dewaxing catalyst can also include a metal hydrogenation component, such as a Group VIII metal. Suitable Group VIII metals can include Pt, Pd, Ni, or a combination thereof, such as Pt and Pd. The dewaxing catalyst can include at least 0.03 wt % of a Group VIII metal, or at least 0.1 wt %, or at least 0.3 wt %, or at least 0.5 wt %, or at least 1.0 wt %, or at least 2.5 wt %, or at least 5.0 wt %. Additionally or alternately, the dewaxing catalyst can include 10.0 wt % or less of a Group VIII metal, or 5.0 wt % or less, or 2.5 wt % or less, or 1.5 wt % or less. For example, the dewaxing catalyst can include 0.03 wt % to 10.0 wt % of a Group VIII metal, optionally a Group VIII noble metal, or 0.3 wt % to 5.0 wt %, or 0.1 wt % to 2.5 wt %.

In some aspects, the dewaxing catalyst can also include a Group VIB metal, such as W or Mo. An example of such an embodiment could be a dewaxing catalyst that includes Ni and W, Mo, or a combination of W and Mo. In such an embodiment, the dewaxing catalyst can include at least 0.5 wt % of a Group VIB metal, or at least 1.0 wt %, or at least 2.5 wt %, or at least 5.0 wt %. Alternatively, the dewaxing catalyst can include 20.0 wt % or less of a Group VIB metal, or 15.0 wt % or less, or 10.0 wt % or less, or 5.0 wt % or less, or 1.0 wt % or less. In some aspects, the dewaxing catalyst can include Ni and W, Ni and Mo, or Ni, W, and Mo.

Catalytic dewaxing can be performed by exposing a feed to a dewaxing catalyst under effective (catalytic) dewaxing conditions. Effective dewaxing conditions can include a temperature of at least 500° F. (260° C.), or at least 550° F. (288° C.), or at least 600° F. (316° C.), or at least 650° F. (343° C.). Alternatively, the temperature can be 750° F. (399° C.) or less, or 700° F. (371° C.) or less, or 650° F. (343° C.) or less. For example, the temperature can be 260° C. to 399° C., or 288° C. to 371° C. The hydrogen partial pressure can be at least 200 psig (1.4 MPa), or at least 500 psig (3.4 MPa), or at least 750 psig (5.2 MPa), or at least 1000 psig (6.9 MPa) and/or 1500 psig (10.3 MPa) or less, or 1200 psig (8.3 MPa) or less, or 1000 psig (6.9 MPa) or less, or 800 psig (5.5 MPa) or less. For example, the pressure can be 1.4 MPa to 10.3 MPa, or 1.6 MPa to 3.3 MPa. The Liquid Hourly Space Velocity (LHSV) can be at least 0.3 $hr^{-1}$, or at least 1.0 $hr^{-1}$, or at least 1.5 $hr^{-1}$ and/or 5.0 $hr^{-1}$ or less, or 3.0 $hr^{-1}$ or less, or 2.0 $hr^{-1}$ or less. For example, the LHSV can be 0.3 $hr^{-1}$ to 5.0 $hr^{-1}$. The hydrogen treat gas rate can be at least 500 scf/bbl (84 $Nm^3/m^3$), at least 750 scf/bbl (126 $Nm^3/m^3$), or at least 1000 scf/bbl (169 $Nm^3/m^3$) and/or 4000 scf/bbl (674 $Nm^3/m^3$) or less, 2000 scf/bbl (337 $Nm^3/m^3$) or less, 1500 scf/bbl (253 $Nm^3/m^3$) or less, or 1250 scf/bbl (211 $Nm^3/m^3$) or less. For example, the treat gas rate can be 84 $Nm^3/m^3$ to 674 $Nm^3/m^3$.

Additional Hydroprocessing—Hydrotreating

In some aspects, additional hydroprocessing, such as hydrotreating, can be performed before and/or after catalytic dewaxing. A hydrotreating process can remove oxygen, sulfur, and nitrogen from a feed and saturate olefins. Hydrotreating can make a feed better suited to a dewaxing process and/or improve the quality of a blend component for diesel fuel.

A hydrotreating catalyst can contain at least one Group VIB metal and/or Group VIII metal on a support such as silica, silica-alumina, alumina or titania. Examples include Co—Mo, Ni—Mo, Ni—Co—Mo, and Ni—W. Hydrotreating conditions can be selected to be similar to the dewaxing conditions noted above. In some aspects, the hydrotreating conditions can include a temperature of 500° F. (260° C.) to 800° F. (427° C.), a hydrogen partial pressure of 200 psig (1.4 MPa) to 3000 psig (20.7 MPa), an LHSV of 0.1 $hr^{-1}$ to 10 $hr^{-1}$, and a hydrogen treat gas rate of 500 scf/bbl (84 $Nm^3/m^3$) to 10000 scf/bbl (1685 $Nm^3/m^3$).

If a hydrotreating stage is used prior to dewaxing, a separation device can optionally be used to separate out impurities prior to passing the hydrotreated feed to the dewaxing stage. The separation device can be a separator, a stripper, a fractionator, or another device suitable for separating gas phase products from liquid phase products. For example, a separator stage can be used to remove $H_2S$ and NH$_3$ formed during hydrotreating. Alternatively, the entire effluent from the hydrotreating stage can be cascaded to the dewaxing stage if desired.

Dewaxed Diesel Fuel Properties

A dewaxed diesel fuel can meet one or more common industry standards for diesel fuel, such as ASTM D975, CAN/CGSB-3.517, EN 590, CAN/CGSB-3.520, ASTM D7467, or CAN/CGSB-3.522. In addition, a dewaxed diesel fuel can contain common diesel fuel additives, such as lubricity improver, cetane improver, conductivity improver, corrosion inhibitor, detergent, marker, dye, antioxidant, and combinations thereof. Optionally, a dewaxed diesel fuel can meet one or more common industry standards for other distillate fuels (e.g., heating oil, marine distillate), such as ASTM D396, CAN/CGSB-3.2, or ISO 8217. A common practice is to supply these other distillate fuels by recertifying on-road diesel fuel, in which case they can readily benefit from cold flow improvements for on-road diesel fuel (typically the most severe application for cold flow). The cold filterability of a dewaxed diesel fuel can be tested by methods such as LTFT and CFPP. Common industry standards for LTFT include ASTM D4539 and CAN/CGSB-3.0 No. 140.1, and common industry standards for CFPP include ASTM D6371, IP 309, and EN 116. These methods can also be modified in various ways (e.g., cooling rate, screen size) to provide alternative methods for testing cold filterability. Cold filterability requirements for a dewaxed diesel fuel, such as minimum LTFT pass temperature or CFPP, can vary substantially based on geographic location and time of year. For example, requirements for minimum LTFT pass temperature can be 0° C. or less, or −10° C. or less, or −20° C. or less, or −30° C. or less, or −40° C. or less, such as −47° C. or possibly lower.

For a dewaxed diesel fuel containing FAAE, a cold flow additive can be added to a distillate fraction (e.g., a dewaxed distillate fraction), the diesel base prior to FAAE addition, the dewaxed diesel fuel after FAAE addition, or some combination thereof. It can be beneficial for solubility to add the cold flow additive to a component and/or blend that is elevated in temperature, such as shortly after hydroprocessing. By including FAAE in a dewaxed diesel fuel, the response of the dewaxed diesel fuel to cold flow additive (i.e., the improvement in cold filterability) can be increased, and this increased response can be demonstrated by the rigorous LTFT method. A dewaxed diesel fuel containing FAAE can have a drop in minimum LTFT pass temperature associated with the use of cold flow additive of up to 13° C. or possibly more. Optionally but preferably, the drop in minimum LTFT pass temperature can be 5° C. or more, or 9° C. or more.

EXAMPLES

In the following examples, diesel fuels may be referred to based on their content of FAME. A "B0" refers to a diesel fuel that does not include FAME. A "B2" refers to a diesel fuel that contains 2 vol % FAME, while a "B5" refers to a diesel fuel that contains 5 vol % FAME. The FAME used in each example is a canola methyl ester with a cloud point of −3.4° C. and a CSFBT of 1.4.

Example 1—Dewaxed Diesel Fuels (Isomerization Dewaxing)

A diesel fuel (B0) with a catalytically dewaxed heavy component was treated with five commercially available cold flow additives (A-E). For the diesel fuel in Example 1, the heavy component was dewaxed in the presence of a catalyst that operates primarily by isomerization. The diesel fuel had a T5 of 216° C. and a T95 of 334° C. The commercially available cold flow additives are marketed as improving CFPP, pour point, LTFT, or some combination of these properties. Treat rates in each case were near the upper end specified by the additive supplier in its product data sheet, and ranged from 1000 ppmv to 3000 ppmv. A second group of samples was also prepared corresponding to a blend of the diesel fuel with 5 vol % FAME (B5) and treated with the same set of additives. The effect on minimum LTFT pass temperature is shown in FIG. 1. In all cases, the presence of FAME unexpectedly resulted in a significantly larger decrease in minimum LTFT pass temperature, i.e., improvement in cold flow. For the B0 samples, the addition of the cold flow additives resulted in decreases in minimum LTFT pass temperature of 2° C. to 4° C. By contrast, the addition of the cold flow additives to the B5 samples resulted in decreases in minimum LTFT pass temperature of 9° C. to 13° C. This was unexpected in view of the conventional impact of adding FAME to a diesel fuel. Due to less favorable cold flow properties, such as a higher cloud point and higher pour point, addition of FAME to a diesel fuel would conventionally be expected to increase the minimum LTFT pass temperature. This conventionally expected increase was demonstrated by the increase in minimum LTFT pass temperature for the B5 sample without a cold flow additive. However, the synergistic effect of adding both FAME and a cold flow additive to the diesel fuel samples was sufficiently large so that the additive-treated B5s actually demonstrated better cold flow than the additive-treated B0s. For comparison, CFPP testing was also completed for this sample set. For the B0 samples, CFPP decreased by 2° C. to 8° C. upon addition of cold flow additives. For the B5 samples, CFPP decreased by −2° C. (an increase in CFPP) to 4° C. upon addition of cold flow additives. Therefore, the benefits of FAME incorporation into a dewaxed diesel fuel could not be inferred from CFPP.

Example 2—Dewaxed Diesel Fuels (Dewaxing Based on Cracking)

Figure 2:
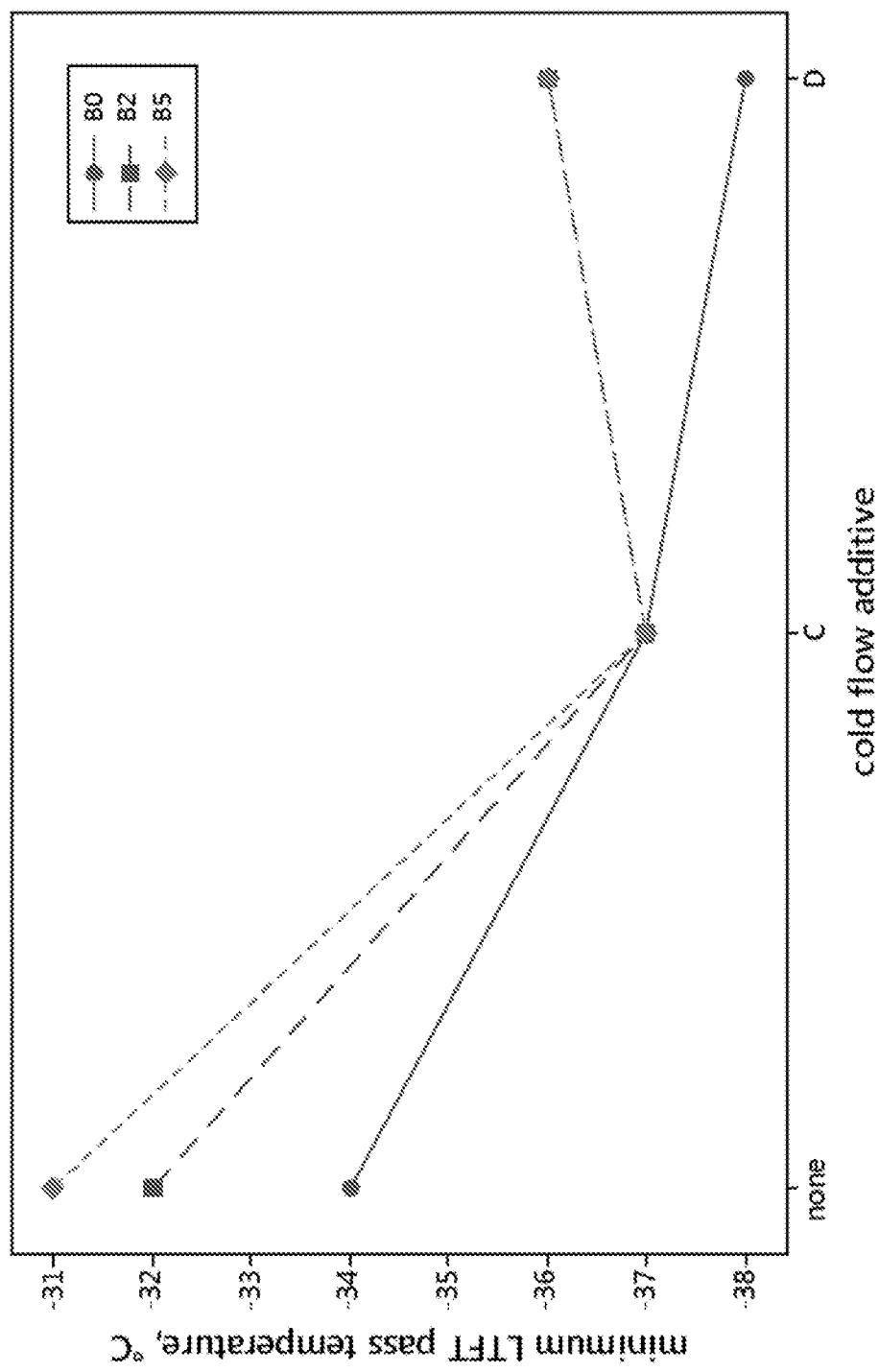
FIG. 2 shows minimum LTFT pass temperatures for a variety of diesel fuels that include a dewaxed distillate fraction that is dewaxed by a catalyst that dewaxes primarily by cracking. The diesel fuels differ in FAME content and/or cold flow additive.

A diesel fuel (B0) with a catalytically dewaxed heavy component was also prepared as a B2 and B5. For the diesel fuel in Example 2, the heavy component was dewaxed in the presence of a catalyst that operates primarily by cracking. The B0 was prepared by blending 70% by volume of the dewaxed heavy component (T5 of 223° C. and T95 of 326° C.) with 30% by volume of a kerosene boiling range component (T5 of 170° C. and T95 of 261° C.). Suitable volumes of FAME were added to the B0 to make the B2 and B5. The B0, B2 and B5 were each treated with 1000 ppmv of cold flow additive C and D from Example 1. The effect on minimum LTFT pass temperature is shown in FIG. 2. While neither B2 nor B5 achieved better cold flow than B0, the B2 and B5 showed larger improvements in cold flow than B0, unexpectedly resulting in fuels with comparable cold flow despite the presence of FAME. This testing was also conducted with two additional sets of B0/B2/B5 with distillate fractions sourced from the same refinery. These additional sets only differed from the first set in the heavy component: one set used a heavy component (T5 of 228° C. and T95 of 327° C.) with mid-level dewaxing and the other set used a heavy component (T5 of 241° C. and T95 of 322° C.) with no dewaxing. The improvements in minimum LTFT pass temperature associated with cold flow additives C and D for all samples are summarized in Table 1. The two digits separated by a comma correspond to results with cold flow additives C and D, respectively.

TABLE 1

Improvement in minimum LTFT pass temperature (° C.)

| Dewaxing | B0 | B2 | B5 |
|---|---|---|---|
| None | 2.3 | 3.4 | 2.3 |
| Mid-level dewaxing | 3.3 | 4.4 | 5.5 |
| Full dewaxing | 3.4 | 5.4 | 6.5 |

As shown in Table 1, the response to additive generally increased with dewaxing severity and, for mid and full dewaxing, with FAME content. Once again, the presence of FAME increased the effectiveness of the cold flow additive, although the additized B2 and B5 compositions had minimum LTFT pass temperatures that were similar to or slightly higher than the B0 compositions'. However, the increased effectiveness of cold flow additives in the presence of FAAE can potentially be beneficial, for example, for producing winter diesel fuels with greater renewable content to satisfy current or future regulations (e.g., low carbon fuels standards, renewable fuels quotas). As in Example 1, testing of these samples by CFPP did not produce comparable results. For instance, the B0/B2/B5 set with full dewaxing of the heavy component showed improvements in CFPP after addition of cold flow additive of 6° C. (B0), 4° C. to 6° C. (B2), and –2° C. to 2° C. (B5). Based on CFPP, which is less stringent but easier to run than LTFT, incorporation of FAME degraded the response to cold flow additive.

Figure 3:
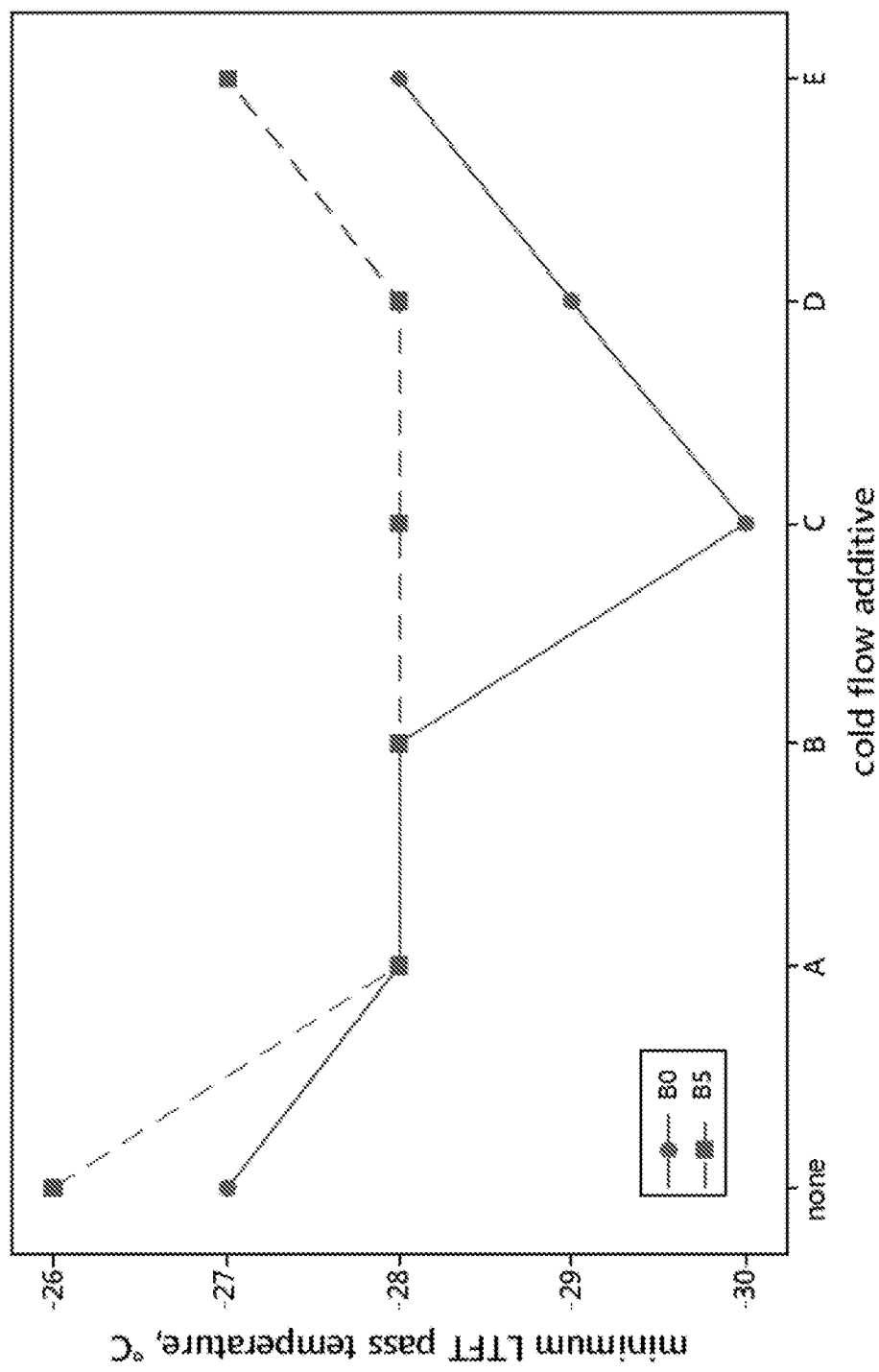
FIG. 3 shows minimum LTFT pass temperatures for a variety of diesel fuels that do not include a dewaxed distillate fraction. The diesel fuels differ in FAME content and/or cold flow additive.

Example 3 (Comparative)—Diesel Fuels (Non-Dewaxed) Including FAME and Cold Flow Additive A diesel fuel without any dewaxed components (B0) was also prepared as a B5. The B0 had a T5 of 192° C. and a T95 of 305° C. Both the B0 and B5 were treated with the same set of cold flow additives as in Example 1. The effect on minimum LTFT pass temperature is shown in FIG. 3. Neither the B0 nor the B5 showed significant improvement in cold flow. Additionally, the improvements observed were similar in size for both the B0 and B5. For comparison, CFPP testing was also completed for this sample set. For the B0 samples, CFPP decreased by 0° C. to 3° C. upon addition of cold flow additives. For the B5 samples, CFPP decreased by 2° C. to 6° C. upon addition of cold flow additives. These CFPP results demonstrate an improved CFPP response to cold flow additive in a non-dewaxed diesel fuel due to FAME. This phenomenon is known in industry and, as the examples demonstrate, does not correlate with improved LTFT response to cold flow additive in dewaxed diesel fuel due to FAME.

Additional Embodiments

Embodiment 1. A method for increasing the response of diesel fuel to cold flow additive, comprising: incorporating 0.5 vol % to 10 vol % of fatty acid alkyl ester into a diesel base comprising a dewaxed distillate fraction to form a diesel fuel composition comprising a minimum low temperature flow test (LTFT) pass temperature of –10° C. or less, wherein the diesel fuel composition further comprises 100 ppmv to 4000 ppmv of a cold flow additive.

Embodiment 2. The method of Embodiment 1, wherein 1.0 vol % to 7.0 vol % of fatty acid alkyl ester is incorporated into the diesel base, or 1.5 vol % to 5.5 vol %, wherein the fatty acid alkyl ester optionally comprises fatty acid methyl ester, the fatty acid methyl ester optionally comprising canola methyl ester, soy methyl ester, corn oil methyl ester, rapeseed methyl ester, sunflower oil methyl ester, or mixtures thereof.

Embodiment 3. The method of any of the above embodiments, wherein the fatty acid alkyl ester has a CSFBT of 1.8 or less, a cloud point of 3° C. or less, or a combination thereof.

Embodiment 4. The method of any of the above embodiments, wherein the cold flow additive comprises copolymers of ethylene and vinyl esters, the vinyl esters optionally comprising vinyl acetate, vinyl 2-ethylhexanoate, or a combination thereof.

Embodiment 5. The method of any of the above embodiments, i) wherein the dewaxed distillate fraction is catalytically dewaxed through isomerization, cracking, or a combination thereof; ii) wherein the cloud point of the dewaxed distillate fraction is –10° C. to –40° C.; or iii) a combination of i) and ii).

Embodiment 6. The method of Embodiment 5, a) wherein catalytic dewaxing comprises catalytic dewaxing in the presence of a catalyst comprising ZSM-48, ZSM-23, or a combination thereof b) wherein catalytic dewaxing comprises catalytic dewaxing in the presence of a catalyst comprising ZSM-5, zeolite Beta, USY, or a combination thereof or c) a combination of a) and b).

Embodiment 7. The method of any of the above embodiments, wherein a drop in minimum LTFT pass temperature associated with the use of cold flow additive for the diesel fuel composition is 5° C. or more, or 9° C. or more.

Embodiment 8. The method of any of the above embodiments, wherein the diesel fuel composition comprises 100 ppmv to 3000 ppmv of cold flow additive; or wherein the diesel fuel composition comprises 300 ppmv to 1500 ppmv of cold flow additive.

Embodiment 9. A diesel fuel composition, comprising a dewaxed distillate fraction, 0.5 vol % to 10 vol % of fatty acid alkyl ester, and 100 ppmv to 4000 ppmv of a cold flow additive, the dewaxed distillate fraction comprising a T5 distillation point of 138° C. or more, the diesel fuel composition comprising a minimum LTFT pass temperature of –10° C. or less.

Embodiment 10. The composition of Embodiment 9, comprising 1.0 vol % to 7.0 vol % of fatty acid alkyl ester, or 1.5 vol % to 5.5 vol % of fatty acid alkyl ester.

Embodiment 11. The composition of Embodiment 9 or 10, wherein the fatty acid alkyl ester comprises fatty acid methyl ester, the fatty acid methyl ester optionally comprising canola methyl ester, soy methyl ester, corn oil methyl ester, rapeseed methyl ester, sunflower oil methyl ester, or mixtures thereof.

Embodiment 12. The composition of any of Embodiments 9-11, wherein the fatty acid alkyl ester has a CSFBT of 1.8 or less, a cloud point of 3° C. or less, or a combination thereof.

Embodiment 13. The composition of any of Embodiments 9-12, wherein the cold flow additive comprises copolymers of ethylene and vinyl esters, the vinyl esters optionally comprising vinyl acetate, vinyl 2-ethylhexanoate, or a combination thereof.

Embodiment 14. The composition of any of Embodiments 9-13, wherein the cloud point of the dewaxed distillate fraction is –10° C. to –40° C.

Embodiment 15. The composition of any of Embodiments 9-14, comprising 100 ppmv to 3000 ppmv of cold flow additive, or 300 ppmv to 1500 ppmv of cold flow additive.

Additional Embodiment A. The method of any of Embodiments 1-8, wherein a change in cold filter plugging point associated with the use of cold flow additive for the diesel fuel composition is a drop of 4° C. or less and/or an increase of 1° C. or more.

Additional Embodiment B. A diesel fuel composition formed according to any of Embodiments 1-8 or Additional Embodiment A.

Additional Embodiment C. The composition of any of Embodiments 9-15, wherein a drop in minimum LTFT pass temperature associated with the use of cold flow additive for the diesel fuel composition is 5° C. or more, or 9° C. or more.

Additional Embodiment D. The composition of any of Embodiments 9-15 or Additional Embodiment C, wherein a change in cold filter plugging point associated with the use of cold flow additive for the diesel fuel composition is a drop of 4° C. or less and/or an increase of 1° C. or more While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for increasing the response of diesel fuel to cold flow additive, comprising:
providing a diesel base comprising a mineral-oil-derived dewaxed distillate fraction with a T95 distillation point of 316° C. to 427° C.,
adding 0.5 vol % to 10 vol % of fatty acid alkyl ester into the diesel base to form a diesel fuel composition comprising a minimum low temperature flow test (LTFT) pass temperature of −30° C. or less, the fatty acid alkyl ester having a cloud point of −5° C. or higher,
wherein the diesel fuel composition further comprises 100 ppmv to 4000 ppmv of a polymeric cold flow additive.

2. The method of claim 1, wherein 1.0 vol % to 7.0 vol % of fatty acid alkyl ester is added into the diesel base.

3. The method of claim 1, wherein 1.5 vol % to 5.5 vol % of fatty acid alkyl ester is added into the diesel base.

4. The method of claim 1, wherein the fatty acid alkyl ester comprises fatty acid methyl ester.

5. The method of claim 4, wherein the fatty acid methyl ester comprises canola methyl ester, soy methyl ester, corn oil methyl ester, rapeseed methyl ester, sunflower oil methyl ester, or mixtures thereof.

6. The method of claim 1, wherein the fatty acid alkyl ester has a CSFBT of 1.8 or less, a cloud point of 3° C. or less, or a combination thereof.

7. The method of claim 1, wherein the cold flow additive comprises copolymers of ethylene and vinyl esters.

8. The method of claim 7, wherein the vinyl esters are vinyl acetate, vinyl 2-ethylhexanoate, or a combination thereof.

9. The method of claim 1, wherein the cloud point of the mineral-oil-derived dewaxed distillate fraction is −10° C. to −40° C.

10. The method of claim 1, wherein the mineral-oil-derived dewaxed distillate fraction is catalytically dewaxed through isomerization, cracking, or a combination thereof.

11. The method of claim 10, wherein catalytic dewaxing comprises catalytic dewaxing in the presence of a catalyst comprising ZSM-48, ZSM-23, or a combination thereof.

12. The method of claim 10, wherein catalytic dewaxing comprises catalytic dewaxing in the presence of a catalyst comprising ZSM-5, zeolite Beta, USY, or a combination thereof.

13. The method of claim 1, wherein a drop in minimum LTFT pass temperature associated with the use of cold flow additive for the diesel fuel composition is 5° C. or more.

14. The method of claim 1, wherein a drop in minimum LTFT pass temperature associated with the use of cold flow additive for the diesel fuel composition is 9° C. or more.

15. The method of claim 1, wherein the diesel fuel composition comprises 300 ppmv to 1500 ppmv of cold flow additive.

16. A diesel fuel composition, comprising a mineral-oil-derived dewaxed distillate fraction, 0.5 vol % to 10 vol % of fatty acid alkyl ester having a cloud point of −5° C. or higher, and 100 ppmv to 4000 ppmv of a polymeric cold flow additive, the mineral-oil-derived dewaxed distillate fraction comprising a T5 distillation point of 138° C. or more and a T95 distillation point of 316° C. to 427° C., the diesel fuel composition comprising a minimum LTFT pass temperature of −30° C. or less.

17. The composition of claim 16, comprising 1.0 vol % to 7.0 vol % of fatty acid alkyl ester.

18. The composition of claim 16, comprising 1.5 vol % to 5.5 vol % of fatty acid alkyl ester.

19. The composition of claim 16, wherein the fatty acid alkyl ester comprises fatty acid methyl ester.

20. The composition of claim 19, wherein the fatty acid methyl ester comprises canola methyl ester, soy methyl ester, corn oil methyl ester, rapeseed methyl ester, sunflower oil methyl ester, or mixtures thereof.

21. The composition of claim 16, wherein the fatty acid alkyl ester has a CSFBT of 1.8 or less, a cloud point of 3° C. or less, or a combination thereof.

22. The composition of claim 16, wherein the cold flow additive comprises copolymers of ethylene and vinyl esters.

23. The composition of claim 22, wherein the vinyl esters are vinyl acetate, vinyl 2-ethylhexanoate, or a combination thereof.

24. The composition of claim 16, wherein the cloud point of the mineral-oil-derived dewaxed distillate fraction is −10° C. to −40° C.

25. The composition of claim 16, comprising 300 ppmv to 1500 ppmv of cold flow additive.

* * * * *